(12) United States Patent
Betran Palomas et al.

(10) Patent No.: US 9,885,343 B2
(45) Date of Patent: Feb. 6, 2018

(54) BLADE FOR A WIND TURBINE, AND A SERVICING UNIT FOR A BLADE

(71) Applicant: Alstom Renewable Technologies, Grenoble (FR)

(72) Inventors: Jaume Betran Palomas, Sant Cugat del Vallès (ES); Jorge Menasanch De Tobaruela, Cabanillas del Campo (ES)

(73) Assignee: ALSTOM Renewable Technologies, Grenoble (FR)

( * ) Notice: Subject to any disclaimer, the term of this patent is extended or adjusted under 35 U.S.C. 154(b) by 320 days.

(21) Appl. No.: 14/433,606

(22) PCT Filed: Oct. 9, 2013

(86) PCT No.: PCT/EP2013/071079
§ 371 (c)(1),
(2) Date: Apr. 3, 2015

(87) PCT Pub. No.: WO2014/056993
PCT Pub. Date: Apr. 17, 2014

(65) Prior Publication Data
US 2015/0275863 A1    Oct. 1, 2015

Related U.S. Application Data

(60) Provisional application No. 61/735,911, filed on Dec. 11, 2012.

(30) Foreign Application Priority Data

Oct. 11, 2012 (EP) ..................... 12382395

(51) Int. Cl.
*F03D 11/00* (2006.01)
*F03D 80/00* (2016.01)
(Continued)

(52) U.S. Cl.
CPC .......... *F03D 11/0016* (2013.01); *F03D 80/00* (2016.05); *F03D 80/40* (2016.05);
(Continued)

(58) Field of Classification Search
CPC .. F03D 11/0016; F03D 11/0013; F03D 80/00; F03D 80/55; F03D 80/50; F03D 80/40
(Continued)

(56) References Cited

U.S. PATENT DOCUMENTS 6,972,498 B2 * 12/2005 Jamieson .............. F03D 7/0236
290/44
8,128,364 B2 * 3/2012 Pesetsky ............... F03D 1/0675
415/4.3
(Continued)

FOREIGN PATENT DOCUMENTS

EP    1 500 815    1/2005
GB    740 177    11/1955
JP    2002-115646    4/2002

*Primary Examiner* — Woody Lee, Jr.
*Assistant Examiner* — Jesse Prager
(74) *Attorney, Agent, or Firm* — Dority & Manning, P.A.

(57) ABSTRACT

A blade for a wind turbine comprises a substantially hollow shell which comprises an opening which extends along at least part of the length of the blade, and a servicing unit displaceable along the blade shell, at least partly arranged inside the shell and comprising an arm adapted to project out of the shell through the opening.

18 Claims, 5 Drawing Sheets

(51) Int. Cl.
*F03D 80/55* (2016.01)
*F03D 80/40* (2016.01)
*F03D 80/50* (2016.01)

(52) U.S. Cl.
CPC ............ *F03D 80/50* (2016.05); *F03D 80/55* (2016.05); *Y02E 10/72* (2013.01)

(58) Field of Classification Search
USPC .......................................... 416/231; 244/214
See application file for complete search history.

(56) References Cited

U.S. PATENT DOCUMENTS

| | | | |
|---|---|---|---|
| 8,167,554 B2* | 5/2012 | Wang | F03D 1/0608 244/204.1 |
| 2010/0003138 A1 | 1/2010 | Siebers et al. | |
| 2010/0132137 A1 | 6/2010 | Eggleston | |
| 2012/0134812 A1 | 5/2012 | Nanukuttan et al. | |

\* cited by examiner

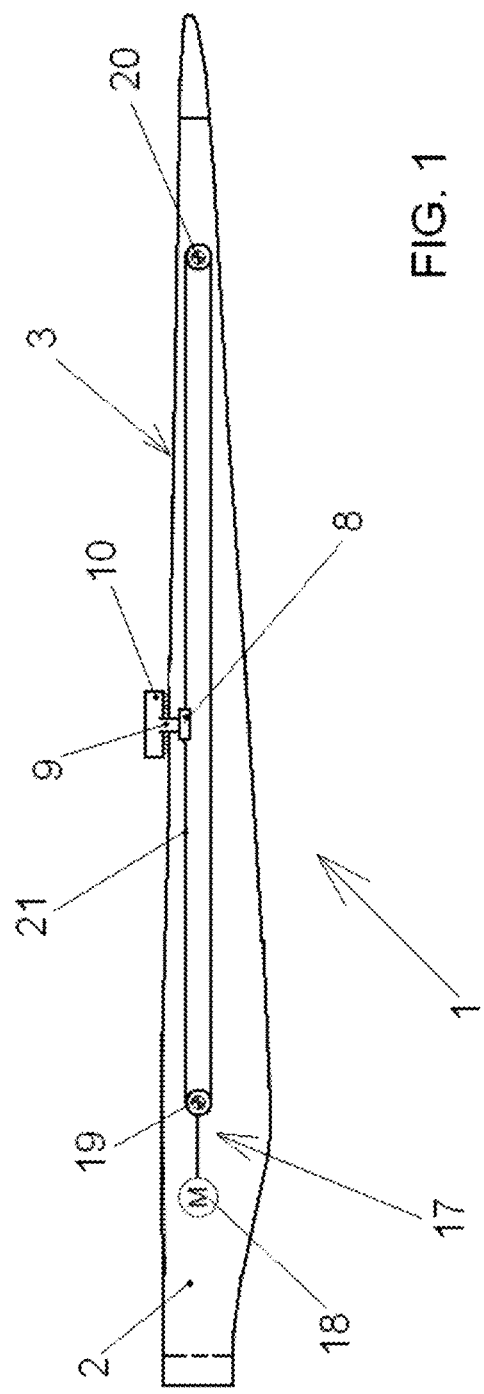

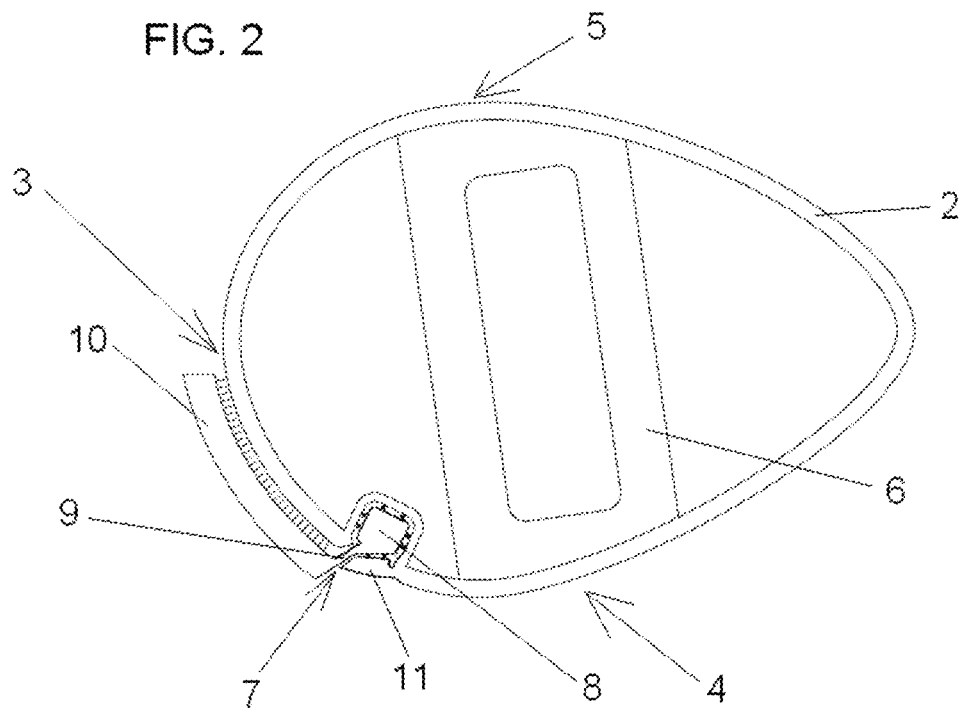
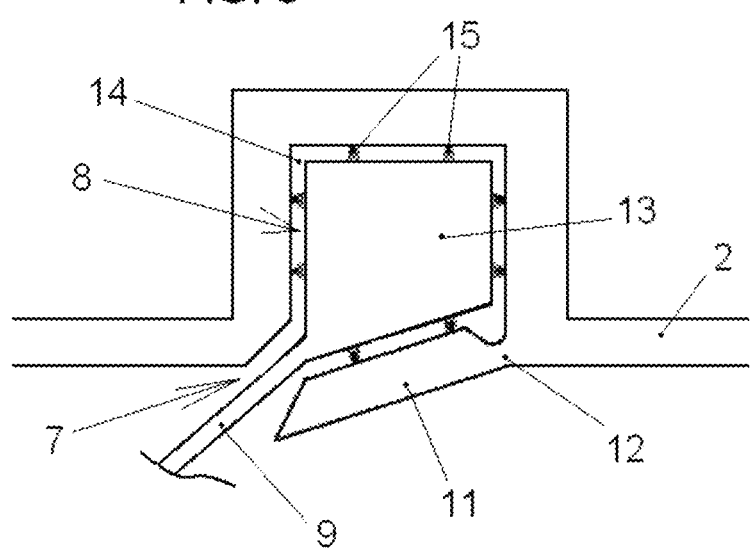

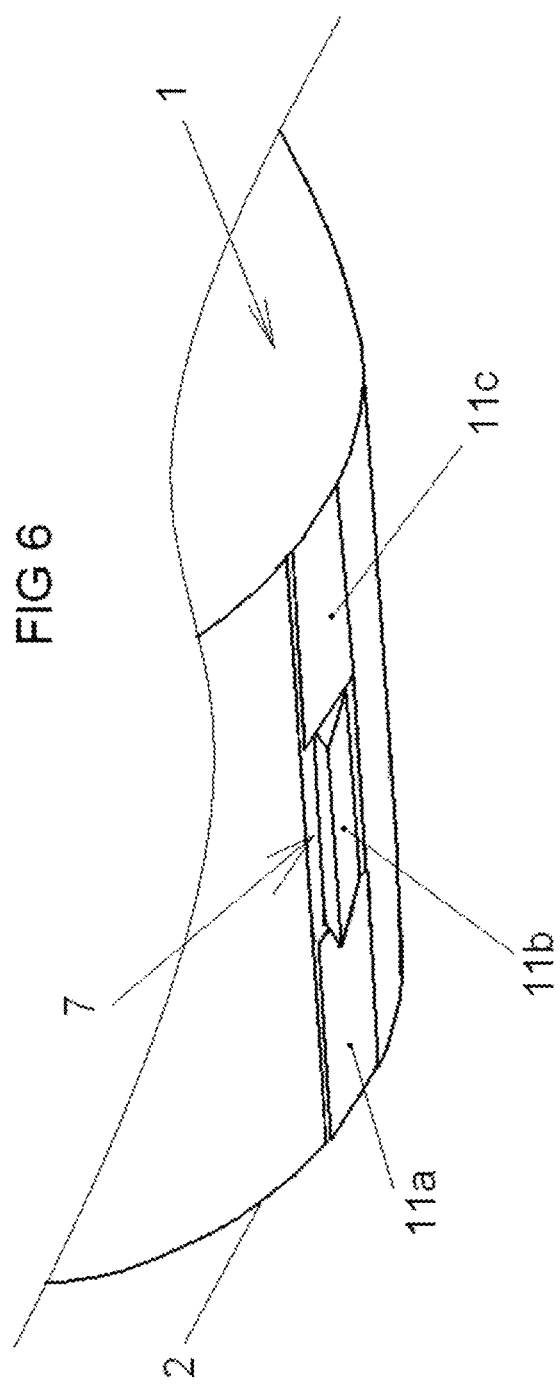

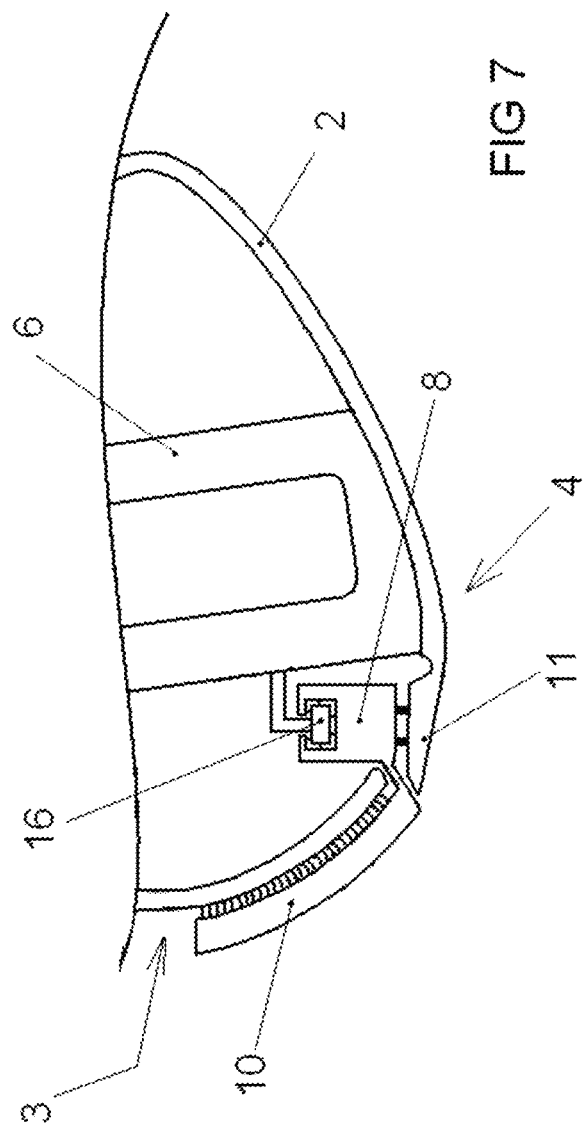

US 9,885,343 B2

BLADE FOR A WIND TURBINE, AND A SERVICING UNIT FOR A BLADE

This application claims the benefit of European Patent Application EP12382395.7 filed on Oct. 11, 2012 and U.S. Provisional Patent Application No. 61/735,911 filed on Dec. 11, 2012.

The present invention relates to a blade for a wind turbine, and to a servicing unit for a blade.

BACKGROUND ART

During operation of a wind turbine, dirt and other materials may accumulate on the surface of the blades, especially on their leading edge: for example, flying insects may impact against the leading edge of the blade due to the rotation and remain attached to it, or ice can form due to the weather conditions around the blades.

The build-up of dirt or ice on the leading edge of the blade may cause a change in the profile, and therefore in the aerodynamic forces acting on the blade, such as to significantly reduce the power generated by the wind turbine, especially with strong winds; it may therefore be desirable to perform maintenance operations on the outer surface of the blade such as cleaning, wiping away insects or other dirt, removing ice, or servicing the surface of the blade in some other way.

Sometimes wind turbine blades may be cleaned by projecting water under pressure from the ground, or by hoisting cleaning staff up to the blade to perform the necessary operations; however, such solutions are far from being satisfactory.

From US2010/0003138 an apparatus is known for cleaning a leading edge of a rotor blade of a wind turbine. In this apparatus a cleaning device that may be displaced along the blade is maintained attached to the blade by magnets arranged inside the blade shell: the solution is relatively complex, and may have associated safety issues.

The aim of the present invention is thus providing a blade and a servicing unit for a blade that allow at least certain maintenance operations to be carried out on the blade surface in a safe and reliable way.

SUMMARY

According to one aspect, the present invention provides a blade for a wind turbine comprising
  a substantially hollow shell which comprises an opening which extends along at least part of the length of the blade, and
  a servicing unit displaceable along the blade shell, at least partly arranged inside the shell and comprising an arm adapted to project out of the shell through the opening.

These features allow carrying out cleaning or any other operations on the blade outer surface efficiently and safely: the presence of the opening in the shell allows arranging part of the servicing unit inside the blade and attaching the projecting arm to this part in a firm and safe way.

The blade may further comprise a closing gate which can move at least between a closed position in which it substantially overlaps the opening, and an open position in which it exposes the opening and allows the passage of the arm therethrough; the closing gate maintains closed the opening in the shell at least when the servicing unit is not in use, thus reducing the impact of the opening on the performance of the blade.

The closing gate may be flexible; furthermore, it may be deformable locally, such that a longitudinal portion of the opening in the shell can be exposed while the rest of the opening remains closed by the closing gate. This possibility of local deformation of the closing gate allows keeping closed most of the length of the closing gate even during operation of the servicing unit, while only a small length is opened to allow the arm of the servicing unit to extend therethrough.

The servicing unit may be adapted to cause shifting of at least part of the closing gate to the open position so as to expose at least part of the opening; according to some embodiments, the unit may be adapted to mechanically interfere with the closing gate such as to push open at least a portion of the closing gate adjacent the servicing unit. This solution provides a simple and efficient way of causing the closing gate to open progressively when the servicing unit travels along the blade, for allowing the passage of the arm.

According to further aspects, the invention provides a servicing unit for a blade as disclosed, and a wind turbine comprising such a blade.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIG. 1 is a longitudinal view of a blade of a wind turbine, showing very schematically the arrangement of a servicing unit according to an embodiment of the invention and the driving system to displace the unit along the blade;

FIG. 2 is a schematic cross sectional view of a blade with a servicing unit according to an embodiment;

FIG. 3 is an enlarged view of a section of a blade according to an embodiment of the invention, where a servicing unit is present;

FIG. 6 is a partial perspective view of a wind turbine blade according to another embodiment of the invention; and FIG. 7 is a schematic view of another embodiment of a blade with a servicing unit.

DETAILED DESCRIPTION OF EMBODIMENTS

Figure 4:
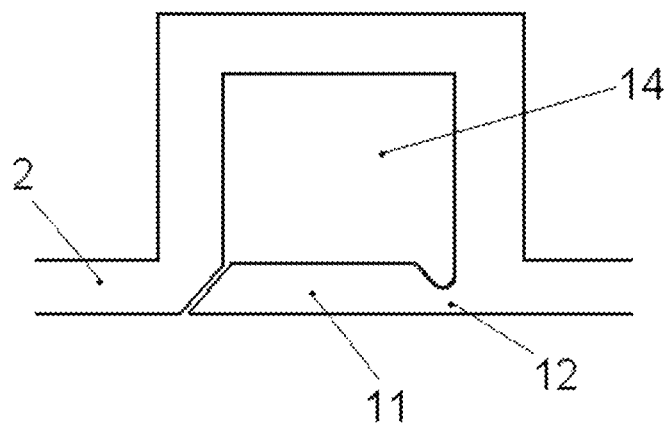
FIG. 4 is a view similar to that of FIG. 3, of a section of a blade according to an embodiment of the invention, where the servicing unit is not present.

FIGS. 1 and 2 show a wind turbine blade 1 comprising a shell 2, which is substantially hollow. The blade 1 has a leading edge 3, a pressure side 4 and a suction side 5. The blade 1 may also comprise an internal stiffening structure 6, inside the hollow shell 2.

The hollow shell 2 of the blade 1 may comprise an elongated opening 7 (not shown in FIG. 1) extending along at least part of the length of the blade 1.

As shown in FIG. 2, the opening 7 may be arranged in the pressure side 4 of the blade 1, such as to have a smaller effect on the performance of the blade.

A servicing unit 8 may be at least partly arranged inside the shell 2, and may comprise an arm 9 which is adapted to project out of the shell 2, through the opening 7; in some embodiments, it is arranged to extend in the proximity of the leading edge 3 of the blade.

The servicing unit 8 may be adapted to be displaced along the blade shell 2, with the arm 9 projecting from the opening 7; during this displacement, servicing operations may be performed outside the blade, typically on its outer surface, by attaching a suitable tool or equipment to arm 9, for example to the distal end of the arm, which may be provided with a coupling for attaching different kinds of tools, in particular tools for servicing the blade surface.

FIG. 2 shows by way of example a cleaning tool 10 attached to the arm 9; for example, the leading edge 3 of the blade 1 may be wiped clean from dust and insects; similarly, ice may be scraped off or caused to melt using suitable means attached to the arm 9.

However, the arm 9 can carry or can be provided with any other maintenance or service tool, as needed. For example, a heating device may be attached to the arm 9 in order to heat the outer part of the blade.

The configuration of the arm 9 and/or of the tools intended to be attached to it may allow reaching different parts of the blade surface, and means may be provided to power the tools if needed.

In some embodiments, the arm also may be moveable to a fold-away position in which it remains inside the shell and does not project from it; for example, this may be achieved by attaching the arm 9 to the rest of the servicing unit 8 by means of a suitable connection.

In order to reduce the impact of the opening 7 on the performance of the blade 1, a closing gate 11 may be provided to close the opening 7 at least when the servicing unit 8 is not in operation: the closing gate 11 can thus move between a closed position in which it substantially overlaps the opening to keep it closed, and an open position in which it exposes the opening 7 and allows the passage of the arm 9.

As will be explained below, it is also foreseen that the closing gate may adopt the closed and the open position selectively along its length, i.e. that while one portion of the closing gate is in open position, another portion of the closing gate is in closed position. For example, the closing gate 11 may be configured such as to allow maintaining open only a relatively small length of the opening 7 around the projecting arm 9, while the rest of the opening 7 remains closed.

FIG. 3 shows an enlarged, schematic view of an embodiment of a blade 1 with a shell 2, an opening 7, a closing gate 11, and a servicing unit 8 arranged inside the shell and having an arm 9 that can project from the opening 7. In the embodiment shown in this figure, the servicing unit 8 may comprise a carriage 13 that may travel along the blade guided in a channel 14, as will be described later on.

FIG. 4 shows another section of a blade, where the servicing unit 8 is not present, and with the closing gate 11 in closed position.

Figure 5:
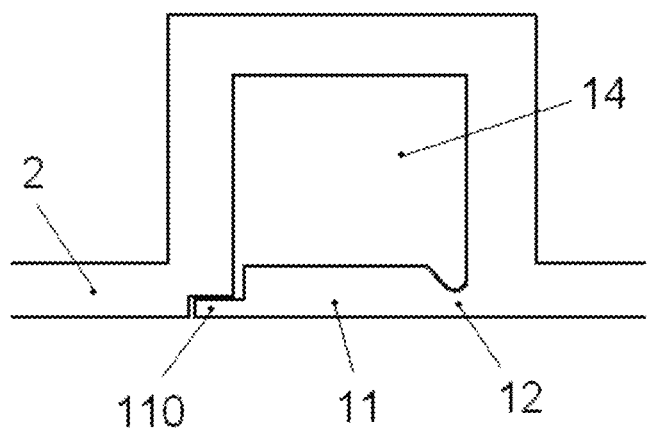
FIG. 5 is a view similar to FIG. 4, showing a slightly different embodiment.

As shown in FIG. 4, the opening 7 and the closing gate 11 may be configured in such a way that in the closed position the outer surface of the flap remains flush with the outer surface of the blade, such that the blade has no projections or recesses in the region of the closing gate. As shown in the alternative embodiment of FIG. 5, a distal edge of the closing gate 11 may also comprise a projecting tab 110, intended to overlap the shell 2 in the closed position of the tab 110 and thus cover the narrow slit that may remain between the frame of the opening 7 and the closing gate 11.

The closing gate 11 may be pivotally attached to the shell 2, as shown in FIGS. 3 and 4; for example it may be integrally formed with the shell 2, with a narrower section 12 forming a hinge to allow pivoting of the closing gate between the open and the closed position. Alternatively, the flap 11 may be independent of the shell, and may be made of a different material; in such cases, it will be provided with suitable means for attachment to the shell 2.

Embodiments of the invention are foreseen in which the servicing unit 8 itself may cause the movement of at least part of the closing gate to the open position, so as to expose at least part of the opening 7.

Such an embodiment will be described with more detail with reference to FIG. 3, although it will be understood that other embodiments are also possible.

In the embodiment shown, the servicing unit comprises carriage 13, guided by the longitudinal channel 14 which has a suitable shape in cross section for providing this guiding action. Wheels 15 or similar elements may be placed between carriage 13 and channel 14 for a smoother movement. The servicing unit is shaped to mechanically interfere with the closing gate 11, such as to exert a force on it and push it open: more particularly, the lower part of the carriage 13, which in operation is adjacent the opening 7 in the blade shell 2, has a shape protruding at least partly with respect to the opening 7, which pushes the closing gate 11 (at least adjacent the servicing unit 8) towards the open position, and thus allows the arm 9 of the servicing unit to protrude from the opening 7.

In FIG. 3 the closing gate 11 may be flexible, and it may also be deformable locally, i.e. such that when pushed open at one position along its length, only a portion of it deforms, while the rest of the length does not deform: this allows a longitudinal portion of the opening to be exposed (for example in correspondence with the service unit 8), while the rest of the opening remain closed by the flap 11, as shown in FIG. 4.

It will be understood that, in such a case, while the servicing unit 8 travels along the blade 1 the closing gate 11 will open progressively as the unit advances, allowing the arm 9 to travel while projecting from the shell 2, and closes again after the unit proceeds further.

Alternatively, instead of a closing gate 11 that is locally deformable such as described above, the blade may comprise, as shown in FIG. 6, several independent closing gate portions 11a, 11b, 11c, . . . arranged along the opening 7, such that one portion (11b in the figure) can be moved to the open position while the other portions (11a and 11c in the figure) remain closed.

A combined solution with several independent closing gates portions, wherein each portion may be partly deformable, is also possible.

In all cases, the closing gate 11 or closing gate portions 11a, 11b, 11c, . . . may also be opened by a driving unit, or by several driving units, instead of being opened by engagement with the servicing unit 8.

Such driving units may be functionally linked to the servicing unit 8, such that the latter causes the former to act on a portion of the closing gate appropriately during displacement of the servicing unit 8 along the blade 1, or they may be controlled by a control system to be synchronized with the servicing unit.

As explained in relation to FIG. 3, the carriage 13 of the servicing unit 8 may be guided on guiding means arranged inside the shell, such as the channel 14.

An alternative way of guiding the servicing unit 8 is providing a guide fixed to the internal stiffening structure 6 of the blade 1. FIG. 7 shows an embodiment of a blade in which a servicing unit 8, for example the carriage 13 of the unit, is guided for displacement inside the shell 2 by a guiding beam 16 that is fixed to the stiffening structure 6. As shown, the carriage 13 may be configured to slide along the beam 16, and suitable rolling elements may be provided to enhance the movement.

A driving system 17 for displacing the servicing unit 8 along the blade 1 is schematically shown in FIG. 1. It will be appreciated that the driving system 17 is shown in the figure, although it may be completely housed inside the shell. The system 17 may comprise in a simple embodiment a driving motor 18, two pulleys 19 and 20 at the two ends of the intended travel path of the servicing unit 8, and a driving rope or cable 21 wound around the pulleys and to which the servicing unit 8, for example the carriage 13 of FIGS. 3 and 7, is attached.

Alternative systems may be foreseen, such as a driving system actively driving the servicing unit 8 in one direction only, while the return travel may be caused by means of an elastic system, by gravity, or by other means.

A blade 1 according to embodiments of the invention may be provided with a parking position for the servicing unit 8, for example in the vicinity of the hub of the wind turbine rotor; in case the servicing unit 8 is adapted to mechanically interfere to push the closing gate open, as disclosed in some embodiments above, the parking position may be such that there is no such interference.

For example, the shape or arrangement of the guiding means (14 in FIG. 3 or 16 in FIG. 7) may vary when reaching the parking position, such that it guides the servicing unit 8 further inwards in the shell, out of engagement with the closing gate.

In embodiments of the invention it may be foreseen that the arm 9 of the servicing unit 8 may be folded or detached from the unit and withdrawn inside the shell 2 in the parking position; in this case, the arm 9 would not project through the opening when the servicing unit is not in use, and all the opening 7 may be closed in such circumstances.

A servicing unit 8 may be provided to be mounted on a blade 1 that has a suitable opening 7 as disclosed herein.

Blades comprising an opening 7 and a servicing unit 8 as disclosed herein can be mounted on a wind turbine to reduce the loss in generated power due to the accumulation of debris, ice or the like on the blade in a safe and simple manner, and to reduce installation and maintenance costs.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A blade for a wind turbine, comprising
  a substantially hollow shell which comprises an opening which extends along at least part of the length of the blade,
  a servicing unit displaceable along the shell, at least partly arranged inside the shell and comprising an arm adapted to project out of the shell through the opening, and
  a closing gate moving at least between a closed position in which the closing gate substantially overlaps the opening, and an open position in which the closing gate exposes the opening and allows the passage of the arm therethrough.

2. The blade of claim 1, wherein the closing gate is pivotably attached to the shell.

3. The blade of claim 2, wherein the closing gate is integrally formed with the shell, with a narrower section forming a hinge.

4. The blade of claim 1, wherein the closing gate is flexible and locally deformable such that a longitudinal portion of the opening is exposed while the rest of the opening remains closed by the closing gate.

5. The blade of claim 1, wherein the closing gate comprises several independent closing gate portions along a length of the opening, such that one closing gate portion shifts to the open position while other closing gate portions remain in the closed position.

6. The blade of claim 1, wherein a distal edge of the closing gate comprises a projecting tab intended to overlap the shell when the closing gate is in the closed position.

7. The blade of claim 1, wherein the servicing unit comprises a carriage which is arranged substantially inside the shell and displaceable along the blade, and to which the arm is attached.

8. The blade of claim 7, wherein the shell is provided with an internal stiffening structure and a guide for guiding the carriage, the guide being fixed to the stiffening structure.

9. The blade of claim 7, wherein the shell is provided with an internal longitudinal channel at least along part of the blade, the channel having a shape in cross section adapted to serve as a guide for guiding the carriage.

10. The blade of claim 1, wherein the servicing unit is disposed to engage the closing gate as the servicing unit moves along the shell to cause shifting of at least part of the closing gate to the open position so as to expose at least part of the opening.

11. The blade of claim 10, wherein the servicing unit pushes to the open position at least a portion of the closing gate adjacent the servicing unit.

12. The blade of claim 11, wherein the blade comprises a parking position for the servicing unit, whereby when the servicing unit is in the parking position the servicing unit doesn't interfere with the closing gate.

13. The blade of claim 1, wherein the arm is moveable between a deployed position in which the arm projects from the shell through the opening and a fold-away position in which the arm remains inside the shell.

14. The blade of claim 1, wherein a blade surface servicing tool is attached at a distal end of the arm.

15. The blade of claim 1, wherein the arm is arranged to extend in proximity to the leading edge of the blade.

16. The blade of claim 1, wherein the opening in the shell is located on a pressure side of the blade.

17. A wind turbine comprising the blade of claim 1.

18. A blade for a wind turbine, comprising:
  a substantially hollow shell which comprises an opening which extends along at least part of the length of the blade,
  a servicing unit displaceable along the shell, comprising a carriage arranged inside the shell and an arm attached to the carriage and adapted to project out of the shell through the opening, and
  a closing gate moving at least between a closed position in which the closing gate substantially overlaps the opening, and an open position in which the closing gate exposes the opening and allows the passage of the arm therethrough.

* * * * *